(12) United States Patent
Iyoda et al.

(10) Patent No.: US 7,800,837 B2
(45) Date of Patent: *Sep. 21, 2010

(54) CYLINDRICAL MOLDED ARTICLE, LENS BARREL, CAMERA, AND INJECTION MOLD

(75) Inventors: Makoto Iyoda, Osaka (JP); Suguru Nakao, Hyogo (JP); Shouichi Irie, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/467,650

(22) Filed: May 18, 2009

(65) Prior Publication Data
US 2009/0225439 A1    Sep. 10, 2009

Related U.S. Application Data

(63) Continuation of application No. 12/059,786, filed on Mar. 31, 2008, now Pat. No. 7,554,756.

(30) Foreign Application Priority Data
Aug. 3, 2007    (JP) .............................. 2007-203524

(51) Int. Cl.
*G02B 15/14* (2006.01)
(52) U.S. Cl. ........................................ 359/700; 359/819
(58) Field of Classification Search ......... 359/811–830, 359/700
See application file for complete search history.

(56) References Cited

U.S. PATENT DOCUMENTS 4,950,060 A    8/1990    Nagasaka 6,304,794 B1    10/2001   Nishimine et al.
7,554,756 B2 *  6/2009    Iyoda et al. .................. 359/819
2001/0015861 A1  8/2001   Sasaki

FOREIGN PATENT DOCUMENTS

| JP | 56-083708  | 7/1981  |
|----|------------|---------|
| JP | 61-119114  | 7/1986  |
| JP | 01-280707  | 11/1989 |
| JP | 03-193332  | 8/1991  |
| JP | 8-164566   | 6/1996  |
| JP | 09-061689  | 3/1997  |
| JP | 2955509    | 7/1999  |

(Continued)

OTHER PUBLICATIONS

Japanese Office Action, with English translation, issued in Japanese Patent Application No. 2007-203524, mailed Feb. 2, 2010.

*Primary Examiner*—Scott J Sugarman
*Assistant Examiner*—Vipin M Patel
(74) *Attorney, Agent, or Firm*—McDermott Will & Emery LLP (57) ABSTRACT

A drive frame 34 as a cylindrical molded article has a drive frame main body 34a, three first cam grooves 34c, three second cam grooves 34d, three high-density regions H, and three cam pins 43. The cam pins 43 are disposed in the circumferential direction between first center lines X1 which are positioned in the center in the circumferential direction between adjacent high-density regions H, and the high-density regions H.

9 Claims, 7 Drawing Sheets

FOREIGN PATENT DOCUMENTS

| | | |
|---|---|---|
| JP | 2002-370268 | 12/2002 |
| JP | 2003-185907 | 7/2003 |
| JP | 2004-004269 | 1/2004 |
| JP | 3523249 | 2/2004 |
| JP | 2004-148525 | 5/2004 |
| JP | 2005-274802 | 10/2005 |
| JP | 2006-322985 | 11/2006 |
| JP | 2006-330540 | 12/2006 |
| JP | 2007-015291 | 1/2007 |

* cited by examiner

CYLINDRICAL MOLDED ARTICLE, LENS BARREL, CAMERA, AND INJECTION MOLD

CROSS-REFERENCE TO RELATED APPLICATIONS

This application is a continuation of U.S. application Ser. No. 12/059,786, filed on Mar. 31, 2008 now U.S. Pat. No. 7,554,756, which claims priority to Japanese Application No. 2007-203524, filed on Aug. 3, 2007, the contents of which are hereby incorporated by reference.

BACKGROUND OF THE INVENTION

1. Field of the Invention

The present invention relates to a cylindrical molded article and an injection mold, and more particularly relates to a cylindrical molded article used in the lens barrel of a camera and an injection mold.

2. Description of the Related Art

One conventional type of lens barrel is a multistage retractable lens barrel. This kind of lens barrel is made up of a plurality of cylindrical members of different diameter. To covert the rotational motion of the cylindrical members into axial linear motion, three cam grooves and three cam pins that engage with these cam grooves are provided to a plurality of cylindrical members, for example. The cam grooves are usually formed on the inner peripheral part of the cylindrical members.

It is generally difficult to machine cam grooves on the inner peripheral part of cylindrical members. Therefore, the cylindrical members that make up a lens barrel are formed by injection molding. An injection molding apparatus mainly includes an injection mold, and an injection apparatus for injecting the molten molding material into the mold. The injection apparatus can be adjusted for molding material injection pressure and injection speed.

The injection mold is provided with a cavity, a sprue, a plurality of runners, and a plurality of gates. The cavity is a hollow space used for form a molded article, The sprue is a channel through which flows the molding material injected from the injection apparatus. The runners guide the molding material from the sprue to the cavity. The gates are constrictions for preventing the back-flow of the molding material from the cavity to the runners, and are disposed between the runners and the cavity. In the case of a cylindrical molded article, a plurality of runners are disposed at a constant pitch in the circumferential direction so that the molding material will flow evenly. A plurality of gates are also disposed at a constant pitch in the circumferential direction.

Injection molding mainly includes a temperature adjustment step in which the temperature of the metal mold is adjusted, a filling step in which the mold is filled with the molding material, and a pressure-holding cooling step in which the molded article is cooled inside the mold. In the pressure-holding cooling step, the pressure is held at a specific level by the injection apparatus. This causes molding material to be supplied to portions where heat shrinkage has occurred, and minimizes deformation of the molded article due to heat shrinkage.

However, the wall thickness of the cylindrical molded article is uneven because of the cam grooves. Consequently, the thicker and thinner parts cool at different rates in the pressure-holding cooling step, so the heat shrinkage varies from place to place. As a result, there is a decrease in the circularity of the cylindrical molded article, and the cylindrical molded article cannot be obtained as designed. Even though the pressure is maintained in the pressure-holding cooling step, it may be impossible to suppress deformation of the molded article, depending on the shape of the cam grooves.

If the cylindrical molded articles that make up a lens barrel have decreased circularity, the cam grooves will be offset in the radial direction from the designed positioned. As a result, the lens group supported by the plurality of cylindrical molded articles becomes out of position, and this adversely affects the optical performance of the imaging optical system. Also, if the cam grooves become misaligned in the radial direction with respect to the designed position, there will be greater sliding resistance between the cam grooves and the cam pins, which hinders smooth zoom operation. As a result, greater drive force is necessary, and this increases power consumption.

In view of this, as disclosed in Japanese Patents 3,523,249 and 2,995,509, correction of the injection mold is generally carried out in conventional injection molding. More specifically, with a conventional metal mold design, deformation due to heat shrinkage is predicted on the basis of experimentation or simulation. The mold is produced in the shape of the molded article according to the predicted amount of deformation. Next, a prototype is formed using the mold thus produced. The dimensions of the various parts of the prototype are measured, and the differences between the design and measured values are calculated. Metal mold correction is performed using this dimensional error as an offset value. In the case of cylindrical molded articles used in a lens barrel, the cavity of the mold is formed as a cylindrical hollow space that is not a true circle.

If there is a large difference between the design and measured values, then more of the mold has to be machined, so mold correction takes more time. Also, if there is a large difference between the design and measured values, then there is greater dimensional change in the various parts of a prototype formed with the corrected mold than with a prototype formed with the initial mold. Consequently, it is unlikely that a molded article will be obtained with the design values after just one mold correction.

Conversely, if there is a small difference between the design and measured values in a prototype produced by the initial mold, mold machining takes less time and it is more likely that a cylindrical molded article will be obtained with the design values after a single mold correction.

As discussed above, it is preferable with an injection mold for the error from the design values of a molded article to be kept as small as possible.

On the other hand, there is a need in the field of digital cameras for the main body to be as compact as possible to make the product more portable. More specifically, there is a need to reduce the size of the lens barrel, which is considered to be a major factor in obtaining a smaller overall size. One way to make a lens barrel smaller is to increase the change ratio of the focal distance in zooming. As this is done, the shape of the cam grooves becomes more complicated, and the difference in the wall thickness of the cylindrical molded articles increases. Consequently, reducing the size of a lens barrel leads to a decrease in dimensional precision in cylindrical molded articles.

In addition, when cam pins are provided in the cylindrical molded article, the position of the cam pins in the radial direction changes with the deformation of the cylindrical molded article in the radial direction. For this reason, it is thought a case that the cam pins will not be able to fit in the corresponding cam grooves, or a case that the cam pins will unnecessarily interfere with the cam grooves, and so forth.

However, with the prior art discussed above, all that was proposed was a method for measuring dimensional error, or a method for predicting dimensional error by simulation and factoring this error into the metal mold design.

When a cylindrical molded article having a cam groove is injection molded, there seems to be some kind of relationship between the circularity and shape of the cam groove, but the details of this relationship are not yet clear. Therefore, with a conventional injection mold, even if changes are made to the shape of the cam grooves, there is the risk that more mold corrections will be necessary.

SUMMARY OF THE INVENTION

It is an object of the present invention to provide a cylindrical molded article and an injection mold, with which manufacturing cost can be reduced and dimensional precision can be increased.

The cylindrical molded article according to a first aspect of the present invention is a member molded by injection molding. This cylindrical molded article includes a cylindrical portion, at least three cam grooves, at least three cam pins, and at least three high-density regions. The cam grooves are formed on either the inner peripheral face or the outer peripheral face of the cylindrical portion. The cam pins are formed on the other face of either the inner peripheral face or the outer peripheral face of the cylindrical portion. The high-density regions on the face where the cam grooves are formed are where there is the highest proportion of the axial direction dimension accounted for by the three or more cam grooves with respect to the axial direction dimension of the cylindrical portion. The cam pins are disposed between first center lines which are positioned in the center in the circumferential direction between the adjacent high-density regions, and first high-density regions, each being one of the adjacent high-density regions, in the circumferential direction.

With this cylindrical molded article, since the cam-pins are disposed between the first high-density regions and the first center lines in the circumferential direction, the cam pins can be disposed in areas around the center between portions pushed inward to the inner side in the radial direction and portions pushed outward to the outer side in the radial direction in the cylindrical portion. As a result, the positional precision in the radial direction of the cam pins will not be easily affected by the deformation of the cylindrical portion, and the number of mold corrections can be reduced. In other words, with this cylindrical molded article, the dimensional precision can be ensured while the manufacturing cost is reduced.

The cylindrical molded article according to a second aspect of the present invention is the cylindrical molded article of the first aspect, wherein the cylindrical molded article further includes at least three low-density regions. The low-density regions on the face where the cam grooves are formed are where there is the lowest proportion of the axial direction dimension accounted for by the three or more cam grooves with respect to the axial direction dimension of the cylindrical portion. The cam pins are disposed between the high-density regions and the low-density regions in the circumferential direction.

The cylindrical molded article according to a third aspect of the present invention is the cylindrical molded article of the first or the second aspect, wherein the cam pins are disposed between second center lines that are positioned in the center in the circumferential direction between the first high-density regions and the first center lines, and the first high-density regions, in the circumferential direction.

The cylindrical molded article according to a fourth aspect of the present invention is the cylindrical molded article of any one of the first through third aspects, wherein the three or more cam pins are disposed at a constant pitch in the circumferential direction.

The lens barrel according to a fifth aspect of the present invention is a lens barrel for supporting an imaging optical system. This lens barrel includes the cylindrical molded article of any one of the first to fourth aspects, and a lens frame. The lens frame has the lens group included in the imaging optical system fixed thereto, and has at least three second cam pins that engage with the cam grooves.

The camera according to a sixth aspect of the present invention includes the lens barrel of the fifth aspect, an imaging optical system supported by the lens barrel, an imaging unit for capturing an optical image of a subject formed by the imaging optical system, and an outer case supporting the lens barrel.

The injection mold according to a seventh aspect of the present invention is a mold for injection molding a molding material to obtain a cylindrical molded article having at least three cam grooves. This mold includes a first portion, a second portion, a third portion, and a fourth portion. The first portion has a cavity arranged to mold the cylindrical molded article. The second portion has a sprue as a channel through which the molding material is injected. The third portion has three first runners connected to the sprue. The fourth portion has gates that connect the cavity and the three first runners. The first portion has at least three cam pins, and three high-density regions in which there is the highest proportion of the axial direction dimension accounted for by the portion corresponding to the three or more cam grooves with respect to the axial direction dimension of the cavity. The cam pins are disposed in the circumferential direction between first center lines that are positioned in the center in the circumferential direction between the adjacent high-density regions, and first high-density regions, each being one of the adjacent high-density regions.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

An embodiment according to the present invention will now be described in detail with reference to the drawings.

1. Overview of Digital Camera

Figure 1:
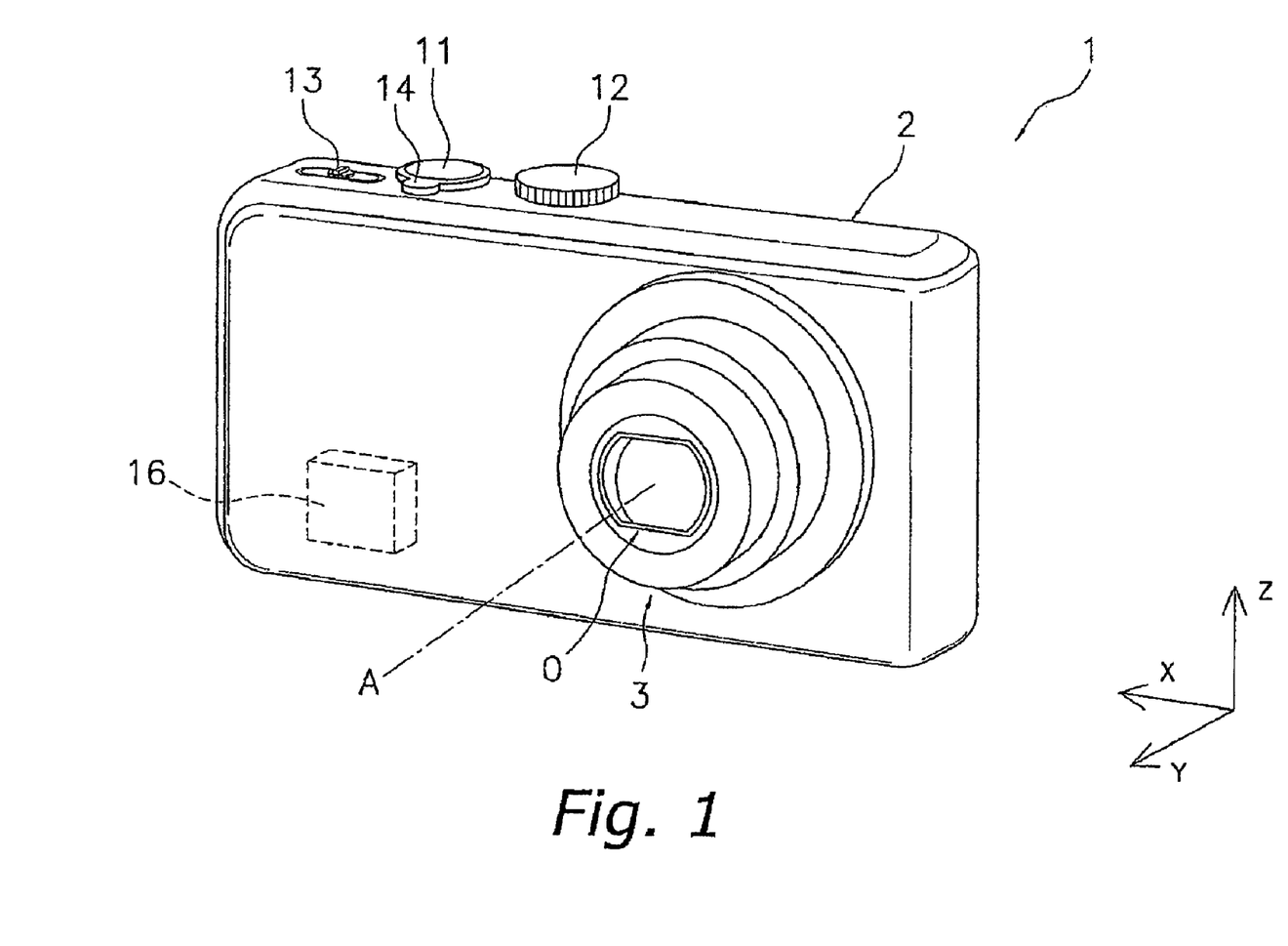
FIG. 1 is a schematic perspective view of a digital camera.
Figure 2:
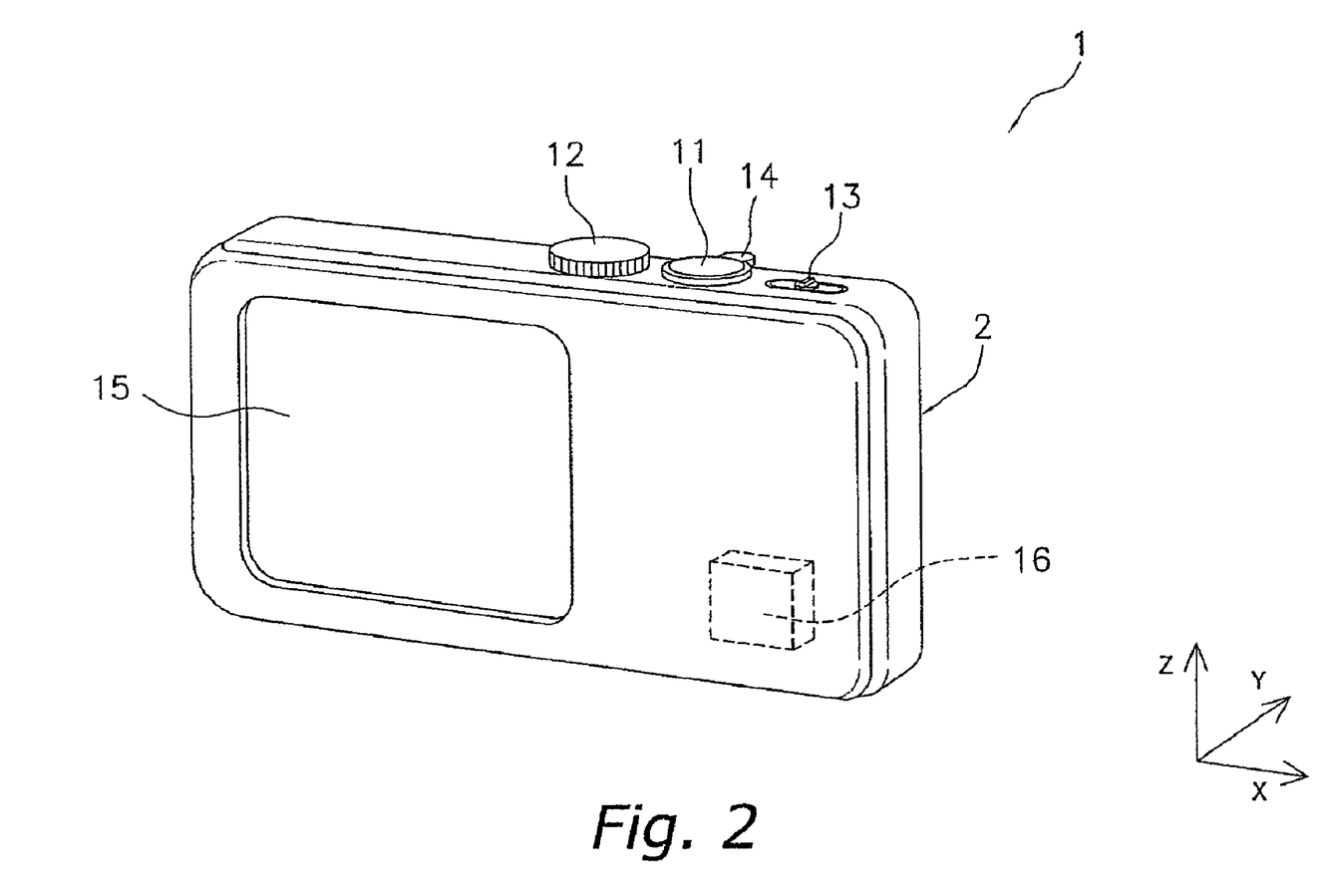
FIG. 2 is a schematic perspective view of a digital camera.

A digital camera 1 in which a cylindrical molded article according to the present invention is used will be described with reference to FIGS. 1 and 2. FIGS. 1 and 2 show schematic perspective views of the digital camera 1. FIG. 1 shows the situation when a lens barrel 3 is in an image capture state. In addition, this digital camera 1 is characterized by the disposition of cam pins 43 of drive frame 34. The disposition of the cam pins 43 will be described later.

The digital camera 1 is a camera for acquiring an image of a subject. A multistage retractable lens barrel 3 is installed in the digital camera 1 in order to afford higher magnification and a more compact size.

In the following description, the six sides of the digital camera 1 are defined as follows.

The side that faces the subject when an image is captured with the digital camera 1 is called the front face, and the opposite side is called the rear face. When an image is captured such that the top and bottom of the subject in the vertical direction coincide with the short-side top and bottom of a rectangular image (generally with an aspect ratio (the ratio of the long side to the short side) of 3:2, 4:3, 16:9, etc.) captured by the digital camera 1, the side of the camera facing upward (vertically) is called the top face, and the opposite side is called the bottom face. Further, when an image is captured such that the top and bottom of the subject in the vertical direction coincide with the short-side top and bottom of a rectangular image captured by the digital camera 1, the side of the camera that is to the left when viewed from the subject side is called the left face, and the opposite side is called the right face. The above definitions are not intended to limit the orientation in which the digital camera 1 is used.

According to the above definitions, FIG. 1 is a perspective view of the front, top, and left faces.

In addition to the six sides of the digital camera 1, the six sides of the various constituent members disposed in the digital camera 1 are similarly defined. That is, the above definitions apply to the six sides of the various constituent members when they have been disposed in the digital camera 1.

Also, as shown in FIG. 1, there is defined a three-dimensional coordinate system (right-hand system) having a Y axis that is parallel to the optical axis A of an imaging optical system O (discussed below). With this definition, the direction from the rear face side toward the front face side along the optical axis A is the Y axis positive direction, the direction from the right face side toward the left face side perpendicular to the optical axis A is the X axis positive direction, and the direction from the bottom face side toward the top face side perpendicular to the X and Y axes is the Z axis positive direction.

This XYZ coordinate system will be referred to in the following description of the drawings. That is, the X axis positive direction, the Y axis positive direction, and the Z axis positive direction in the drawings indicate the same respective directions.

2. Overall Structure of a Digital Camera

As shown in FIGS. 1 and 2, the digital camera 1 mainly includes an outer case 2 that holds the various units, an imaging optical system O that forms an optical image of the subject, and a lens barrel 3 that movably supports the imaging optical system O.

The imaging optical system O is made up of a plurality of lens groups, and these lens groups are disposed in a state of being aligned in the Y axis direction. The lens barrel 3 has a multistage retractable configuration, and is supported by the outer case 2. The plurality of lens groups are supported by the lens barrel 3 to be relatively movable in the Y axis direction. The configuration of the lens barrel 3 will be described in detail below.

A CCD unit 21 serving as an imaging unit that subjects optical images to photoelectric conversion, and an image storing unit 16 that stores the images acquired by the CCD unit 21 are built into the outer case 2. A liquid crystal monitor 15 for displaying the images acquired by the CCD unit 21 is provided to the rear face of the outer case 2.

A shutter release button 11, a control dial 12, a power switch 13, and a zoom adjustment lever 14 are provided to the top face of the outer case 2 so that the user can capture images and perform other such operations. The shutter release button 11 is a button for inputting the exposure timing. The control dial 12 is a dial for making various settings related to image capture. The power switch 13 is used to switch the digital camera 1 on and off. The zoom adjustment lever 14 is used to adjust the zoom magnification, and can rotate over a specific angle range around the shutter release button 11.

FIGS. 1 and 2 show only the main configuration of the digital camera 1, and therefore components other than those discussed above may be provided to the digital camera 1.

3. Configuration of Lens Barrel

Figure 3:
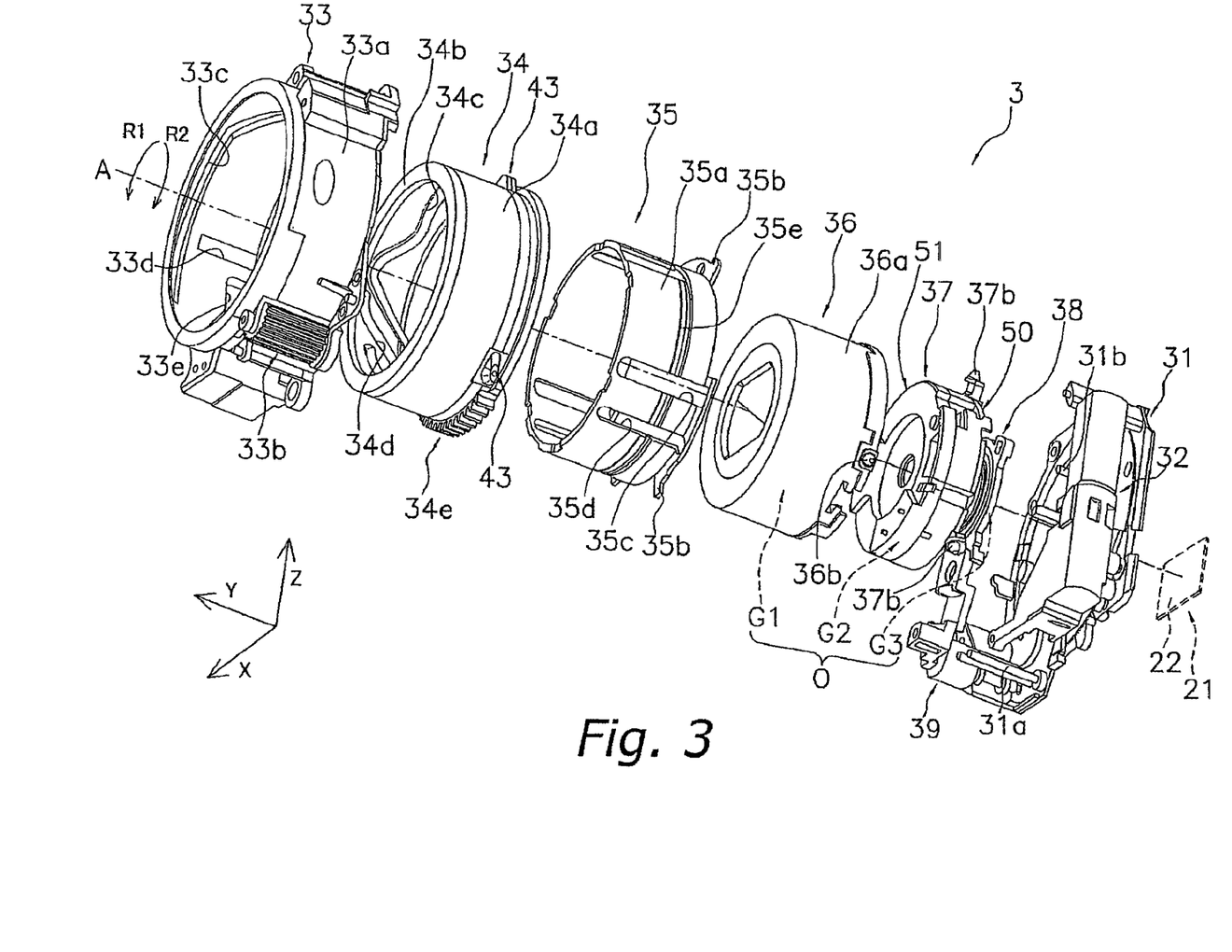
FIG. 3 is an exploded perspective view of a lens barrel.

The overall configuration of the lens barrel 3 will be described with reference to FIG. 3. FIG. 3 is an exploded perspective view of the lens barrel 3.

As shown in FIG. 3, the lens barrel 3 mainly includes a base plate 31 fixed to the outer case 2, a zoom motor 32 fixed to the base plate 31 and serving as a drive source, a stationary frame 33 that holds various frame members between itself and the base plate 31, a drive frame 34 to which the drive force of the zoom motor 32 is inputted, and a straight-movement frame 35 that is supported by the stationary frame 33 to be relatively movable in the Y axis direction. A CCD sensor 22 of the CCD unit 21 is attached to the base plate 31. An example of the zoom motor 32 is a stepping motor.

The lens barrel 3 further includes a first lens frame 36 that supports a first lens group G1, a second lens frame 37 that supports a second lens group G2, and a third lens frame 38 that supports a third lens group G3. The first lens group G1 is, for example, a lens group having negative power overall, and takes in light from the subject. The second lens group G2 is, for example, a lens group having positive power overall. The third lens group G3 is, for example, a lens group having positive power for adjusting the focal point. The imaging optical system O is made up of the first lens group G1, the second lens group G2, and the third lens group G3.

3.1. Stationary Frame

The stationary frame 33 is a member for guiding the drive frame 34, and makes up a member on the stationary side of the lens barrel 3 along with the base plate 31. The stationary frame 33 is fixed by screws to the base plate 31. The stationary frame 33 mainly includes a stationary frame main body 33a that makes up the main part, and a drive gear 33b that is rotatably supported by the stationary frame main body 33a.

The stationary frame main body 33a is fixed to the base plate 31, and the drive frame 34 is disposed inside the inner periphery thereof. The drive gear 33b is a member for transmitting the drive force of the zoom motor 32 to the drive frame 34, and meshes with a gear (not shown) of the zoom motor 32. Three cam grooves 33c for guiding the drive frame 34, and three straight-movement grooves 33d for guiding the straight-movement frame 35 are formed on the inner peripheral part of the stationary frame main body 33a. The cam grooves 33c are spaced equally in the circumferential direction. The straight-movement grooves 33d extend in the Y axis direction, and are spaced equally in the circumferential direction.

3.2. Drive Frame

The drive frame 34 is a member for guiding the first lens frame 36 and the second lens frame 37, and is disposed inside the inner periphery of the stationary frame 33, The drive frame 34 mainly includes a substantially cylindrical drive frame main body 34a that is disposed inside the inner periphery of the stationary frame main body 33a.

Three cam pins 43 are provided as cam members on the outer peripheral part of the drive frame main body 34a, and three first cam grooves 34c and three second cam grooves 34d are formed on the inner peripheral part. The first cam grooves 34c are grooves for guiding the first lens frame 36. The second cam grooves 34d are grooves for guiding the second lens frame 37. The three first cam grooves 34c are spaced equally in the circumferential direction. The three second cam grooves 34d are spaced equally in the circumferential direction. The three cam pins 43 are spaced equally in the circumferential direction, and engage with the three cam grooves 33c of the stationary frame 33. That is, the drive frame 34 is supported by the stationary frame 33 via the cam pins 43.

A gear portion 34e is formed on the outer peripheral part of the drive frame main body 34a. The gear portion 34e meshes with the drive gear 33b of the stationary frame 33. As a result, the drive force of the zoom motor 32 is transmitted through the drive gear 33b to the drive frame 34.

The drive frame 34 is driven around the optical axis A (the R1 direction and the R2 direction) by the drive force of the zoom motor 32. When the camera 1 changes from their retracted state to their image capture state, the drive frame 34 is driven to the R1 side by the zoom motor 32. As a result, the cam pins 43 move along the cam grooves 33c of the stationary frame 33, and the drive frame 34 moves to the Y axis direction positive side relative to the stationary frame 33. When the camera 1 changes from their image capture state to their retracted state, the drive frame 34 is driven to the R2 side by the zoom motor 32. As a result, the drive frame 34 moves to the Y axis direction negative side relative to the stationary frame 33.

Thus, the drive frame 34 is movable in the Y axis direction while rotating relative to the stationary frame 33, according to the shape of the cam grooves 33c.

3.3. Straight-Movement Frame

The straight-movement frame 35 is a member for preventing the rotation of the first lens frame 36 relative to the stationary frame 33, and is disposed inside the inner periphery of the drive frame 34. The straight-movement frame 35 mainly includes a cylindrical straight-movement frame main body 35a and three straight-movement pins 35b formed on the outer peripheral part of the straight-movement frame main body 35a.

The straight-movement pins 35b are disposed on the Y axis direction negative side of the straight-movement frame main body 35a so as not to interfere with the drive frame 34, and engage with the straight-movement grooves 33d in the stationary frame 33. That is, the straight-movement frame 35 is supported by the stationary frame 33 to be relatively straight movable in the Y axis direction.

A bayonet groove 35e is formed on the outer peripheral part of the straight-movement frame main body 35a. A bayonet tab 34f (not shown) formed on the inner peripheral part of the drive frame 34 engages with the bayonet groove 35e. This allows the straight-movement frame 35 to rotate relative to the drive frame 34 and to move integrally in the Y axis direction.

Specifically, when the drive frame 34 rotates relative to the stationary frame 33, the straight-movement frame 35 moves along with the drive frame 34 in the Y axis direction without rotating relative to the stationary frame 33 (while rotating relative to the drive frame 34).

Three first guide grooves 35c and three second guide grooves 35d that extend in the Y axis direction are formed in the straight-movement frame main body 35a. The three first guide grooves 35c are spaced equally in the circumferential direction, and the three second guide grooves 35d are spaced equally in the circumferential direction. Cam pins 36b (discussed below) of the first lens frame 36 are inserted in the first guide grooves 35c. Cam pins 37b (discussed below) of the second lens frame 37 are inserted in the second guide grooves 35d. That is, the rotation of the first lens frame 36 and the second lens frame 37 relative to the stationary frame 33 is restricted by the straight-movement frame 35. Furthermore, movement of the first lens frame 36 and the second lens frame 37 in the Y axis direction is not restricted by the first guide grooves 35c and the second guide grooves 35d.

3.4. First Lens Frame

The first lens frame 36 is a member supporting the first lens group G1 to be relatively movable in the Y axis direction, and is disposed inside the inner periphery of the straight-movement frame 35. The first lens frame 36 mainly includes a first lens frame main body 36a in the interior of which is held the first lens group G1, and the three cam pins 36b provided on the outer peripheral part of the first lens frame main body 36a. The cam pins 36b are passed through the first guide grooves 35c and engage with the first cam grooves 34c of the drive frame 34.

When the drive frame 34 rotates relative to the stationary frame 33, the cam pins 36b move along the first cam grooves 34c. The movement of the cam pins 36b in the rotary direction here is restricted by the first guide grooves 35c of the straight-movement frame 35. Therefore, the cam pins 36b move only in the Y axis direction along the first cam grooves 34c and the first guide grooves 35c. Thus, the first lens frame 36 is movable in the Y axis direction relative to the drive frame 34 according to the shape of the first cam grooves 34c, without rotating relative to the stationary frame 33.

3.5. Second Lens Frame

The second lens frame 37 is a member supporting the second lens group G2 to be relatively movable in the Y axis direction, and is disposed inside the inner periphery of the straight-movement frame 35 and on the Y axis direction negative side of the first lens frame 36. The second lens frame 37 mainly includes a first frame 50 and second frame 59 in the interior of which is held the second lens group G2, and the three cam pins 37b provided on the outer peripheral part of the first frame 50. The cam pins 37b are passed through the second guide grooves 35d and engage with the second cam grooves 34d of the drive frame 34.

When the drive frame 34 rotates relative to the stationary frame 33, the cam pins 37b move along the second guide grooves 35d. The movement of the cam pins 37b here in the rotational direction is restricted by the second guide grooves 35d of the straight-movement frame 35. Therefore, just as with the first lens frame 36, the cam pins 37b move only in the Y axis direction along the second cam grooves 34d and the second guide grooves 35d.

Thus, the second lens frame 37 is movable in the Y axis direction relative to the drive frame 34 according to the shape of the second cam grooves 34d, without rotating relative to the stationary frame 33.

3.6. Third Lens Frame

The third lens frame 38 is a member supporting the third lens group G3 to be relatively movable in the Y axis direction, and is supported by focus shafts 31a and 31b of the base plate 31 to be relatively movable in the Y axis direction. The third lens frame 38 is driven by a focus motor 39 fixed to the base plate 31. The focus motor 39 moves the third lens frame 38 in the Y axis direction relative to the base plate 31.

3.7. Summary

To summarize the above configuration, the first lens frame 36 and the second lens frame 37 can be moved in the direction along the optical axis A by the zoom motor 32 via the stationary frame 33, the drive frame 34, and the straight-movement frame 35. The third lens frame 38 can be moved in the direction along the optical axis A by the focus motor 39.

Therefore, this configuration results in a retractable lens barrel 3 that allows adjustment of the focus and the zoom magnification of the imaging optical system O.

4. Cylindrical Molded Article and Injection Mold

Figure 4A:
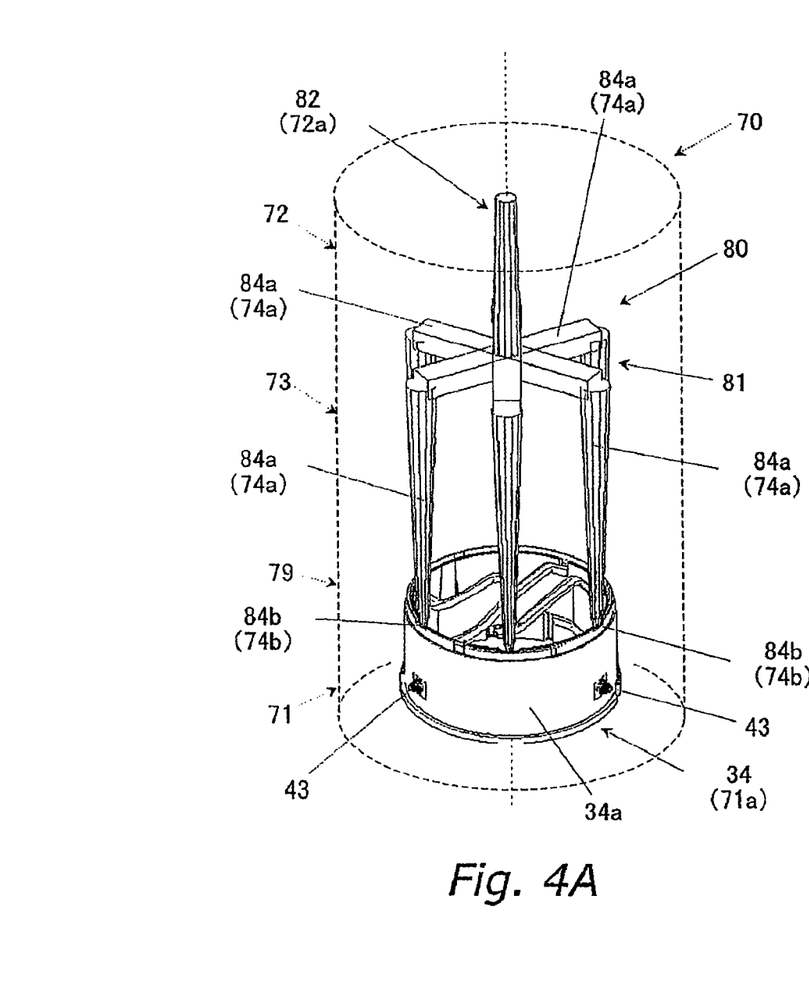
FIGS. 4A and 4B are schematic diagrams of a molded article 80 and an injection mold 70.
Figure 4B:
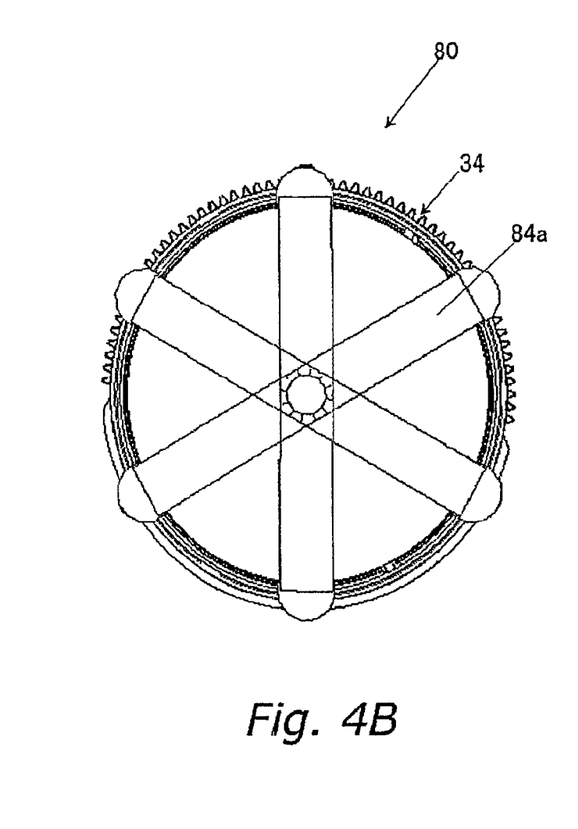

A cylindrical molded article and an injection mold according to this embodiment will be described. Here, drive frame 34 will be described as an example of a molded article. In FIGS. 4A and 4B, schematic diagrams of a molded article 80 and an injection mold 70 are shown. FIG. 4A is a schematic perspective view of the molded article 80 and the injection mold 70, and FIG. 4B is a plan view of the molded article 80 seen in the axial direction.

4.1. Molded Article

As shown in FIGS. 4A and 4B, the molded article 80 is made from a synthetic resin removed from the mold 70 after injection molding. Example of the synthetic resin is a polycarbonate or other such a thermoplastic resin. The molded article 80 mainly includes the drive frame 34 as a cylindrical molded article, and a channel portion 81. The channel portion 81 is separated from the drive frame 34 after injection molding. As discussed above, a total of six cam grooves (the first cam grooves 34c and the second cam grooves 34d) are formed on the inner peripheral side of the drive frame 34.

The channel portion 81 is a portion formed by a channel in the mold 70 during injection molding, and includes a sprue portion 82, six runner portions 84a linked to the sprue portion 82, and six gate portions 84b. The runner portions 84a are disposed at a constant pitch in the circumferential direction. The gate portions 84b are disposed at a constant pitch in the circumferential direction, for example, and are disposed on an annular end face of the drive frame 34 that is directed to the axial direction.

4.2. Disposition of the Cam Pins

Figure 5:
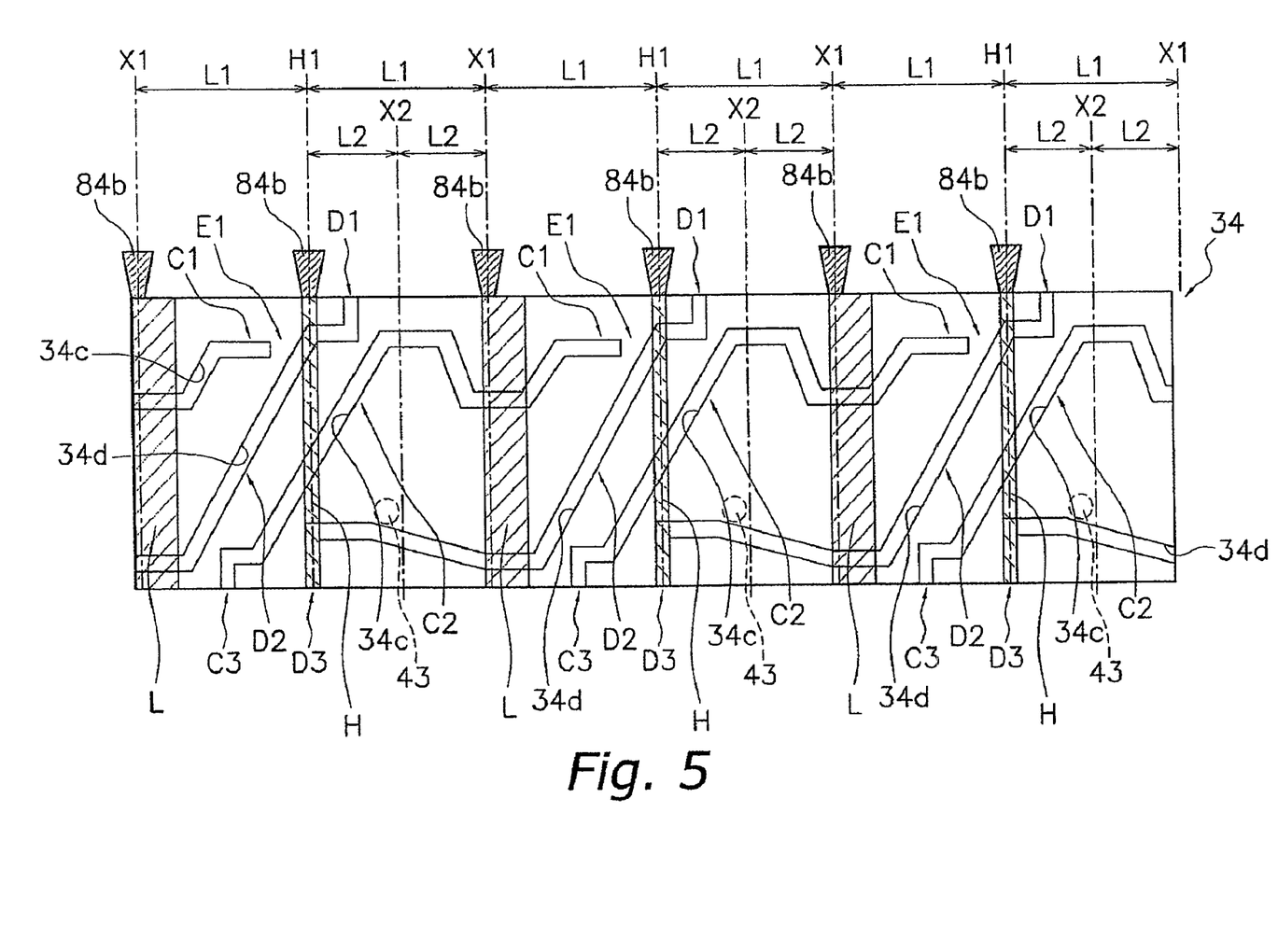
FIG. 5 is a development view of the inner peripheral side of a drive frame.
Figure 6:
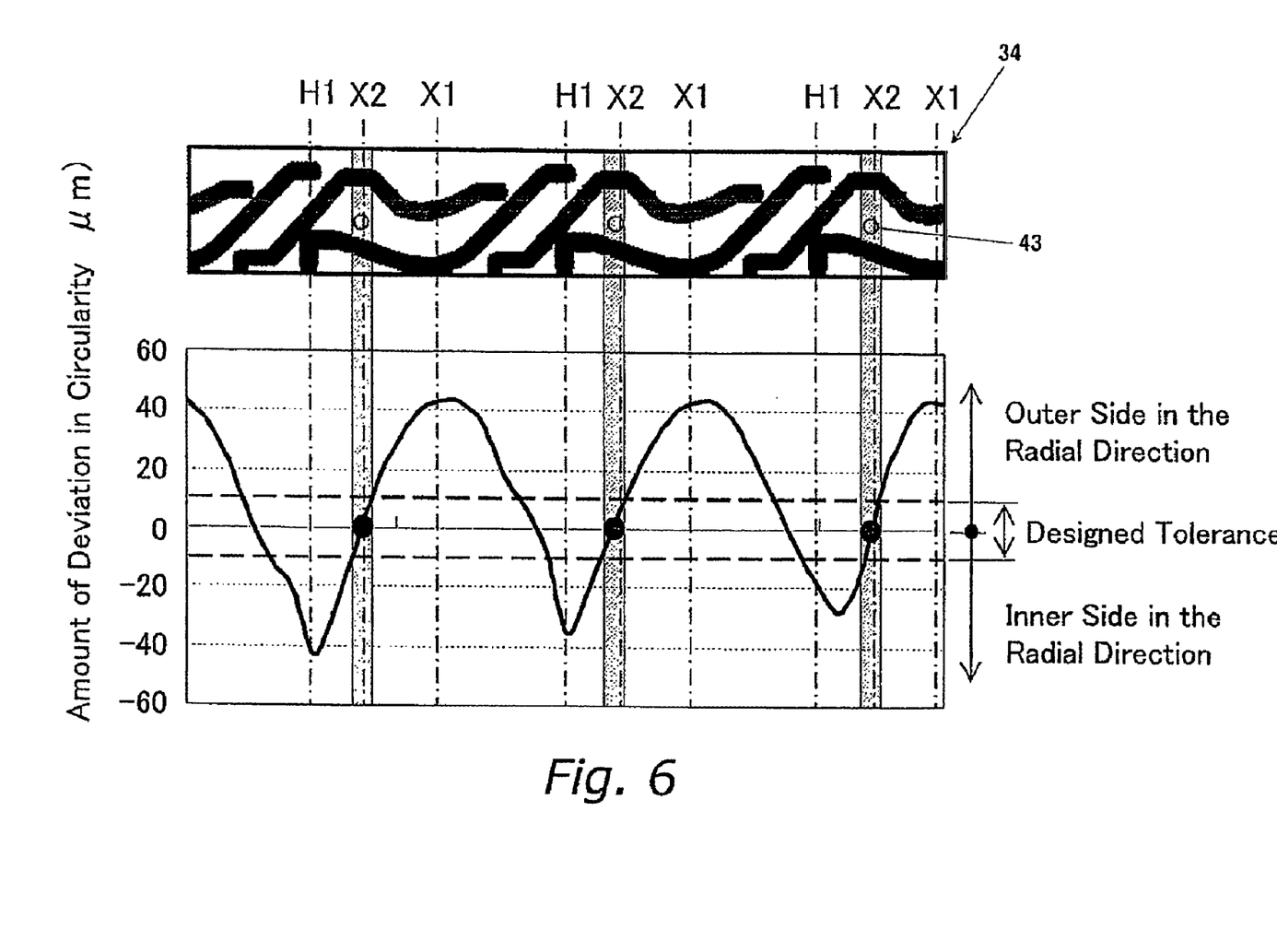
FIG. 6 is a schematic diagram showing the relationship between the disposition of cam grooves and the amount of deviation in circularity of a drive frame.

This drive frame 34 is characterized by the disposition of the cam pins 43. The disposition of the cam pins 43 will be described with reference to FIGS. 5 and 6. FIG. 5 shows a development view of the inner peripheral side of the drive frame 34. FIG. 6 shows the relationship between the disposition of the cam grooves 34d on the inner peripheral side of the drive frame 34 and the amount of deviation in circularity. Here, the disposition will be described using the constitution of the molded article 80, but since the constitution of the molded article 80 corresponds to the constitution of the mold 70, the following description can be considered to apply to the mold 70 as well, and not just to the molded article 80.

As shown in FIG. 4B, the three cam pins 43 are disposed at a constant pitch in the circumferential direction. As shown in FIG. 5, the three first cam grooves 34c and the three second cam grooves 34d are formed on the inner peripheral side of the drive frame 34. The three first cam grooves 34c all have the same shape, and are disposed at a constant pitch in the circumferential direction. The three second cam grooves 34d all have the same shape, and are disposed at a constant pitch in the circumferential direction. The first cam grooves 34c and the second cam grooves 34d are alternately disposed in the circumferential direction so as not to cross each other.

The first cam grooves 34c each include a first cam groove main body C2 and a first conducting groove C3 formed at one end of the first cam groove main body C2. The first conducting groove C3 extends in the axial direction, and passes through the end of the drive frame main body 34a. The other end C1 of the first cam groove main body C2 does not pass through in the axial direction.

The second cam grooves 34d each include a second cam groove main body D2, a second conducting groove D1 formed at one end of the second cam groove main body D2, and a third conducting groove D3 formed at the other end of the second cam groove main body D2. The second conducting groove D1 and the third conducting groove D3 extend in the axial direction, and pass through the end of the drive frame main body 34a.

In this embodiment, the first cam grooves 34c have the same width from the end C1 to the first conducting groove C3. The second cam grooves 34d have the same width from the second conducting groove D1 to the third conducting groove D3. Also, the first cam grooves 34c and the second cam grooves 34d have the same width.

The drive frame 34 does not have a constant wall thickness because of the first cam grooves 34c and the second cam grooves 34d. More specifically, on the inner peripheral face of the drive frame 34, there are three high-density regions H in which the proportion accounted for by the cam grooves is highest, and three low-density regions L in which the proportion accounted for by the cam grooves is lowest. The three high-density regions H are disposed at a constant pitch in the circumferential direction. The three low-density regions L are disposed at a constant pitch in the circumferential direction.

The high-density regions H are regions in which there is the highest proportion of the axial direction dimension accounted for by the first cam grooves 34c and the second cam grooves 34d with respect to the axial direction dimension of the drive frame 34, on the inner peripheral face of the drive frame 34. The low-density regions L are regions in which there is the lowest proportion of the axial direction dimension accounted for by the first cam grooves 34c and the second cam grooves 34d with respect to the axial direction dimension of the drive frame 34, on the inner peripheral face of the drive frame 34. As shown in FIG. 5, the high-density regions H coincide with the portion in which the third conducting groove D3 extends in the axial direction. The low-density regions L coincide with the portion in which the first cam grooves 34c and the second cam grooves 34d extend in the circumferential direction.

Figure 7:
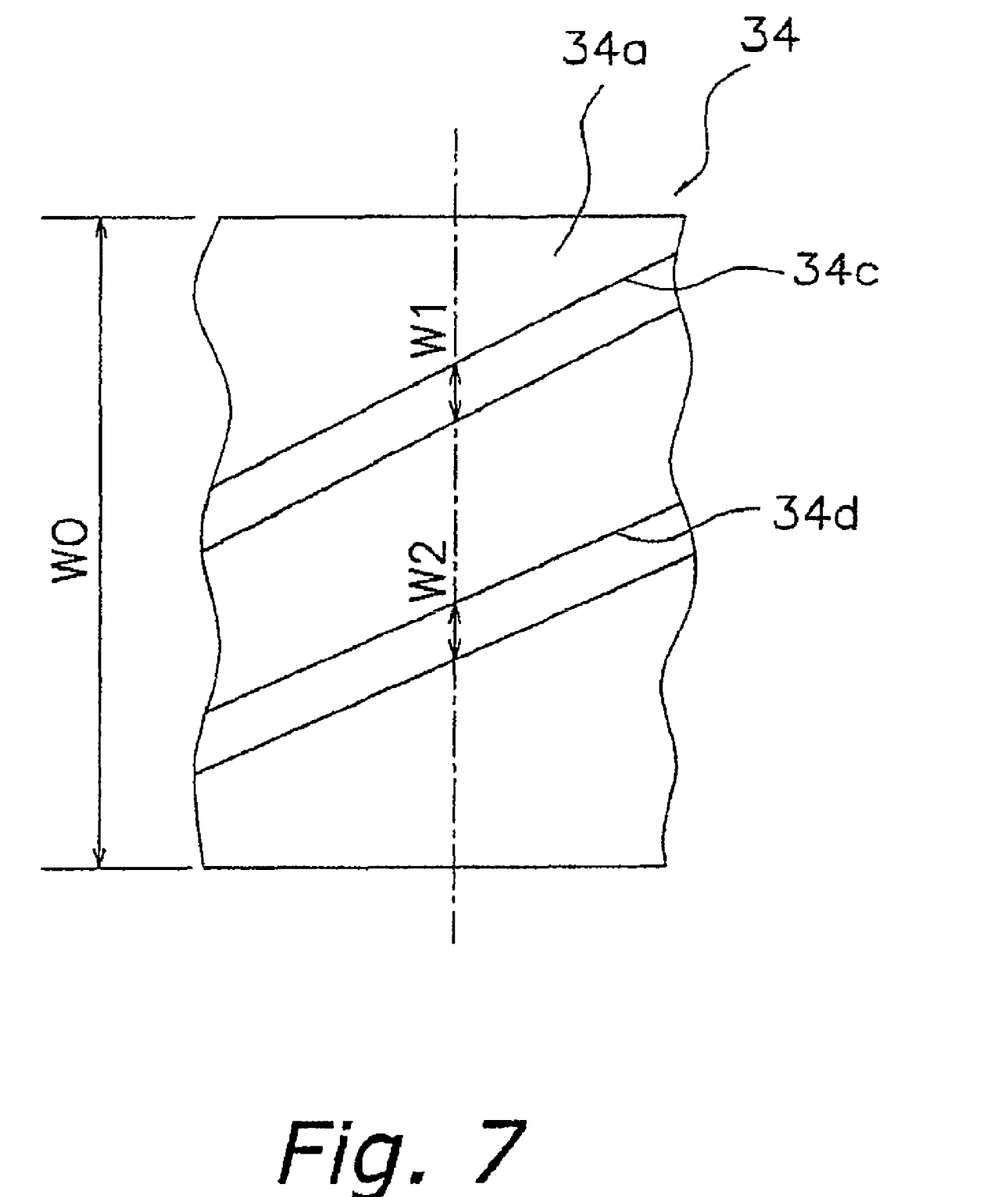
FIG. 7 is a schematic diagram of the method for determining the high-density regions and low-density regions.

The method for determining the high-density regions H and the low-density regions L will be described. As shown in FIG. 7, a case in which two grooves are formed, a first cam groove 34c and a second cam groove 34d is assumed. W0 is defined as the axial direction dimension of the drive frame 34 (more specifically, the drive frame main body 34a), W1 is defined as the axial direction dimension of the first cam groove 34c, and W2 is defined as the axial direction dimension of the second cam groove 34d. In this case, P, which is "the proportion of the axial direction dimension accounted for by the first cam grooves 34c and the second cam grooves 34d with respect to the axial direction dimension of the drive frame 34", is expressed by P=(W1+W2)/W0. The clusters of lines where the proportion P is highest are the high-density regions H, and the clusters of lines where the proportion P is lowest are the low-density regions L.

The disposition of cam pins 43 and the cam grooves will now be described in detail.

As shown in FIG. 6, as a result of examining the relationship between the shape of the cam grooves 34d and the curvature deformation during molding of the drive frame 34 (cylindrical molded article), the drive frame 34 tends to deform to the inner side in the radial direction in the high-density regions H, and deform to the outer side in the radial direction in the low-density regions L. This is possibly because the thickness of the drive frame 34 is thin and bends easily in the high-density regions H compared to the surrounding portions. In other words, it is understood that the deformation pattern of the drive frame 34 is mainly determined by the position of the high-density regions H. This results in the cam pins 43 to be out of position in the radial direction to the inner side if the cam pins 43 are disposed in areas around the high-density regions H, and results in the cam pins 43 to be out of position in the radial direction to the outer side if the cam pins 43 are disposed in areas around the low-density regions L arranged near the center in the circumferential direction between the high-density regions H. As a result, the positional precision of the cam pins 43 in the radial direction does not satisfy the designed tolerance.

Consequently, the position of the cam pins 43 are determined mainly based on the high-density regions H in this drive frame 34, so that the positional precision of the cam pins 43 satisfies the designed tolerance, More specifically, as shown in FIGS. 5 and 6, the cam pins 43 are disposed between the high-density regions H and the low density regions L in the circumferential direction. The cam pins 43 are disposed in the circumferential direction between the high-density regions H (first high-density regions) and first center lines X1, which are positioned in the center in the circumferential direction between the adjacent high-density regions H. The high-density regions H are regions having almost the same circumferential direction dimension as the width of the third conducting grooves D3, and have base lines H1, which are center lines in the circumferential direction. Since the first center lines X1 are disposed in the center in the circumferential direction between the adjacent base lines H1, the distance (L1) between the base lines H1 and the first center lines X1 in the circumferential direction is equal.

Furthermore, the cam pins 43 are disposed in the circumferential direction between the high-density regions H and second center lines X2, which are positioned in the center in the circumferential direction between the high-density regions H and the first center lines X1. More specifically, the second center lines X2 are disposed in the center in the circumferential direction between the base lines H1 of the high-density regions H and the first center lines X1. The distance between the base lines H1 and the second center lines X2 in the circumferential direction is the same length (L2) as the distance between the second center lines X2 and the first center lines X1 in the circumferential direction. The cam pins 43 are disposed in areas around the second center lines X2, between the second center lines X2 and the base lines H1 which are nearest to the second center lines X2 in the circumferential direction. In other words, in the case that the regions between the adjacent high-density regions H are divided into four equal parts in the circumferential direction, the position of the cam pins 43 are set in the one-fourth region from the high-density regions H.

In this way, by determining the position of the cam pins 43 based on the high-density regions H and dispose the cam pins 43 in areas around the second center lines X2, the cam pins 43 can be disposed in areas around the center in the circumferential direction between the portion pushed inward to the inner side in the radial direction (for example, the high-density regions H) and the portion pushed outward to the outer side in the radial direction (for example, the low-density regions L). Consequently, the positional precision of the cam pins 43 in the radial direction will not be affected by the deformation of the drive frame main body 34a easily, and the number of mold corrections can be reduced. As a result, with this drive frame 34, dimensional precision can be ensured while the manufacturing cost is reduced.

4.3. Injection Mold

The injection mold 70 is a mold used for injection molding, and mainly includes a first portion 71, a second portion 72, a third portion 73, and a fourth portion 79. The mold 70 is made up of a plurality of parts, but the first portion 71 to the fourth portion 79 are divided in the sense of being portions having different functions. Therefore, the portions 71 to 73 and 79 are not limited to being made up of different parts.

A cavity 71a for molding the drive frame 34 is formed in the first portion 71. The cavity 71a is defined by combining two mold parts (not shown), for example. Since the drive frame 34 having the first cam grooves 34c, the second cam grooves 34d, and the cam pins 43, is molded in the cavity 71a, the first portion 71 includes portions corresponding to the first cam grooves 34c, portions corresponding to the second cam grooves 34d, and portions corresponding to the cam pins 43.

A sprue 72a through which the molten molding material is injected from the injection apparatus (not shown) is formed in the second portion 72. For instance, the sprue 72a is formed by a cylindrical sprue bush (not shown). The sprue portion 82 is molded by the sprue 72a.

Six runners 74a connected to the sprue 72a are formed in the third portion 73. Six gates 74b are formed in the fourth portion 79. One end of the runners 74a is connected to the sprue 72a, and the other end is connected to the gates 74b. The runner portions 84a are molded by the runners 74a, and the gate portions 84b are molded by the gates 74b.

5. Operation of Digital Camera

The operation of the digital camera 1 will be described with reference to FIGS. 1 to 3.

5.1. When Power is Off

When the power switch 13 is in its off position, the lens barrel 3 is stopped in its retracted position (the state in which the lens barrel 3 is at its shortest in the Y axis direction), so that the lens barrel 3 will fit within the external dimensions of the outer case 2 in the Y axis direction.

5.2. When Power is On

When the power switch 13 is switched on, power is supplied to the various units, and the lens barrel 3 is driven from its retracted state to its image capture state. More specifically, the drive frame 34 is driven by the zoom motor 32 by a specific angle to the R1 side relative to the stationary frame 33. As a result, the drive frame 34 moves to the Y axis direction positive side relative to the stationary frame 33 while rotating relative to the stationary frame 33 according to the shape of the cam grooves 33c.

When the drive frame 34 rotates and moves straight relative to the stationary frame 33, the first lens frame 36 and the second lens frame 37 move along with the drive frame 34 to the Y axis direction positive side relative to the stationary frame 33. The first lens frame 36 and the second lens frame 37 do not rotate relative to the stationary frame 33 at this point.

The first lens frame 36 and the second lens frame 37 move along with the drive frame 34 to the Y axis direction positive side while moving in the Y axis direction relative to the drive frame 34 according to the shape of the first cam grooves 34c and the second cam grooves 34d. At this time the first lens frame 36 and the second lens frame 37 move relatively in the Y axis direction. Specifically, the first lens frame 36 and the second lens frame 37 move in the Y axis direction relative to the stationary frame 33 by an amount that is larger (or smaller) than the amount of movement of the drive frame 34 in the Y axis direction.

When the rotation of the drive frame 34 is stopped, movement of the first lens frame 36 and the second lens frame 37 in the Y axis direction also stops, and the lens barrel 3 is in its image capture state.

5.3. Zoom Operation During Image Capture

When the zoom adjustment lever 14 is operated to the telephoto side, the drive frame 34 is driven by the zoom motor 32 to the R1 side relative to the stationary frame 33, according to the rotational angle and operation duration of the zoom adjustment lever 14. As a result, the drive frame 34, the first lens frame 36, and the second lens frame 37 move together to the Y axis direction positive side relative to the stationary frame 33, and the zoom magnification of the imaging optical system O is increased.

When the zoom adjustment lever 14 is operated to the wide-angle side, the drive frame 34 is driven by the zoom motor 32 to the R2 side relative to the stationary frame 33, according to the rotational angle and operation duration of the zoom adjustment lever 14. As a result, the drive frame 34, the first lens frame 36, and the second lens frame 37 move together to the Y axis direction negative side relative to the stationary frame 33, and the zoom magnification of the imaging optical system O is decreased.

6. Characteristics

The following are characteristics of the molded article 80, the lens barrel 3, the digital camera 1, and the injection mold 70.

6.1.

With this molded article 80, the earn pins 43 are disposed between the high-density regions H and the first center lines X1 in the circumferential direction, and more specifically, disposed in areas around the second center lines X2 located in the center in the circumferential direction between the high-density regions H and the first center lines X1. Consequently, by disposing the cam pins 43 in areas around the second center lines X2, the cam pins 43 can be disposed in areas around the center in the circumferential direction between the portions pushed inward to the inner side in the radial direction (for example, high-density regions H) and the portions pushed outward to the outer side in the radial direction (for example, low-density regions L). As a result, the positional precision of the cam pins 43 in the radial direction will not be easily affected by the deformation of the drive frame main body 34a, and the number of mold corrections can be reduced. As a result, with this drive frame 34, the dimensional precision can be ensured while the manufacturing cost is reduced.

6.2.

As discussed above, since the drive frame 34 or other such molded article 80 with dimensional precision ensured is used for this lens barrel 3, the positional precision of the lens group is stabilized and the optical performance of the imaging optical system O is stabilized. Also, with this molded article 80, the number of mold corrections is reduced, and the manufacturing cost can be reduced. In this way, the optical performance of the lens barrel 3 can be stabilized while the manufacturing cost thereof is reduced. Furthermore, with this digital camera 1, since the optical performance of the imaging optical system O is stabilized, the quality of the acquired image is stabilized.

7. Other Embodiments

The cylindrical molded article, lens barrel, camera, and injection mold according to the present invention are not limited to the above embodiment, and various modifications and alterations can be made herein without departing from the scope of the present invention.

7.1.

The number of gate portions 84b is not limited to six locations. The number of gate portions 84b may be more or fewer than six.

7.2.

In the above embodiment, the case in which the cam grooves 34d are formed on the inner peripheral face of the drive frame 34 is described. However, it is also possible for the cam grooves 34d to form on the outer peripheral face of the drive frame 34 and the cam pins 43 to form on the inner peripheral face. In addition, it is also possible for the cam grooves to form on the inner peripheral face and the outer peripheral face of the drive frame 34. In this case, the high-density regions H and the low-density regions L may be determined based on the cam grooves on the inner peripheral face, or based on the cam grooves on the outer peripheral face.

7.3.

In the above embodiment, the disposition of the cam pins 43 is determined based on the base lines H1, the first center lines X1, and the second center lines X2. However, the position of the cam pins 43 may be determined from the positional relationship between the high-density regions H and the low-density regions L.

GENERAL INTERPRETATION OF TERMS

In understanding the scope of the present invention, the term "configured" as used herein to describe a component section or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

Terms that are expressed as "means-plus functions" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lens barrel for supporting an imaging optical system, comprising:
   a cylindrical molded article formed by injection molding, having a cylindrical portion, at least three cam grooves formed on either the inner peripheral face or the outer peripheral face of the cylindrical portion, and at least three high-density regions on the face where the cam grooves are formed, in which there is the highest proportion of the axial direction dimension accounted for by the three or more cam grooves with respect to the axial direction dimension of the cylindrical portion;
   at least three first cam pins provided to the cylindrical molded article; and
   a lens frame to which the lens group included in the imaging optical system are fixed, and having at least three second cam pins engaging with the cam grooves,
   wherein the first cam pins are disposed between first center lines which are positioned in the center in the circumferential direction between the adjacent high-density regions, and first high-density regions, each being one of the adjacent high-density regions, in the circumferential direction.

2. The lens barrel according to claim 1, further comprising at least three low-density regions on the face where the cam grooves are formed, in which there is the lowest proportion of the axial direction dimension accounted for by the three or more cam grooves with respect to the axial direction dimension of the cylindrical portion,
   wherein the first cam pins are disposed between the high-density regions and the low-density regions in the circumferential direction.

3. The lens barrel according to claim 1,
   wherein the first cam pins are disposed between second center lines which are positioned in the center in the circumferential direction between the first high-density regions and the first center lines, and the first high-density regions, in the circumferential direction.

4. The lens barrel according to claim 1,
   wherein the three or more first cam pins are disposed at a constant pitch in the circumferential direction.

5. The lens barrel according to claim 2,
   wherein the first cam pins are disposed between second center lines which are positioned in the center in the circumferential direction between the first high-density regions and the first center lines, and the first high-density regions, in the circumferential direction.

6. The lens barrel according to claim 2,
   wherein the three or more first cam pins are disposed at a constant pitch in the circumferential direction.

7. The lens barrel according to claim 3,
   wherein the three or more first cam pins are disposed at a constant pitch in the circumferential direction.

8. The lens barrel according to claim 5,
   wherein the three or more first cam pins are disposed at a constant pitch in the circumferential direction.

9. A camera, comprising:
   the lens barrel according to claim 1;
   an imaging optical system supported by the lens barrel;
   an imaging unit for capturing an optical image of a subject formed by the imaging optical system; and
   an outer case supporting the lens barrel.

* * * * *